Dec. 19, 1922.

B. M. W. HANSON.
TRANSMISSION MECHANISM.
FILED FEB. 21, 1920.

1,439,414.

Inventor
Bengt M. W. Hanson

By T. Clay Lindsey.
His Attorney

Patented Dec. 19, 1922.

1,439,414

UNITED STATES PATENT OFFICE.

BENGT M. W. HANSON, OF HARTFORD, CONNECTICUT.

TRANSMISSION MECHANISM.

Application filed February 21, 1920. Serial No. 360,339.

*To all whom it may concern:*

Be it known that I, BENGT M. W. HANSON, a citizen of the United States, and a resident of Hartford, county of Hartford, State of Connecticut, have invented certain new and useful Improvements in a Transmission Mechanism, of which the following is a specification.

This invention relates to transmission mechanism and while having general application finds particular advantage for use generally in metal working machines. The invention has as its object to provide a transmission mechanism of this sort having features of novelty and advantage.

In the accompanying drawings, there is shown one embodiment of the invention, but it is to be understood that the invention is capable of embodiment in various forms and is susceptible of modification and changes, the present disclosure being by way of illustration only.

In describing the embodiment of the invention herein illustrated, conventional terms will be used, but it is to be understood that they are used solely for the purpose of description and are not to be taken as having any limiting effect.

Figure 1:
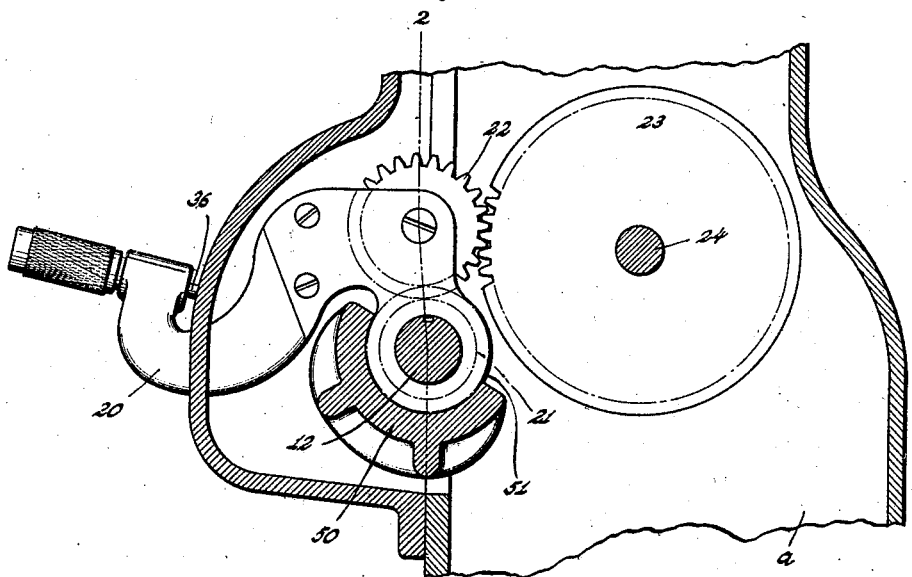
Figure 2:
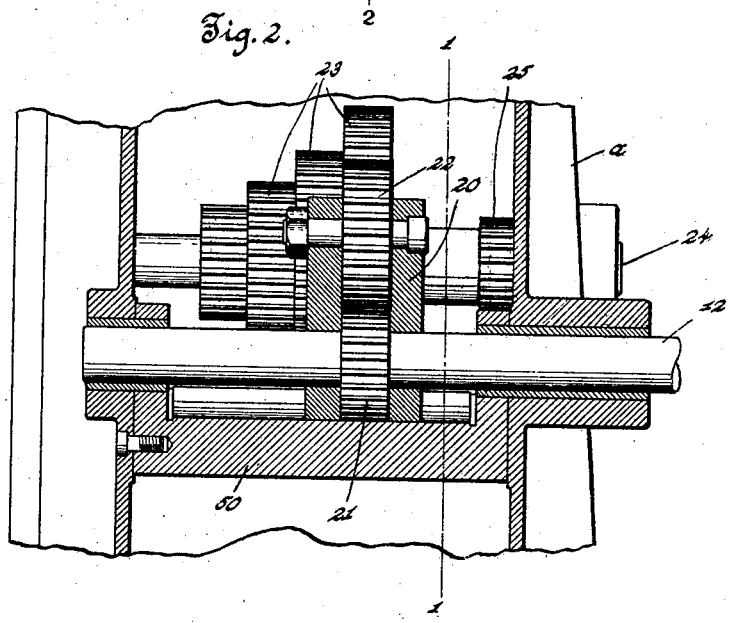

In the accompanying drawings:

Fig. 1 is a vertical section view taken substantially on line 1—1 of Fig. 2; and Fig. 2 is a sectional view taken substantially on line 2—2 of Fig. 1.

Referring to the drawings in detail, *a* denotes a base, housing or casing in which are journaled a pair of shafts 12 and 24, one of which (in the present instance shaft 12) may be referred to as the "drive shaft"; the other being driven through the drive shaft. Slidable on the drive shaft 12 is a rocker 20 straddling a gear 21 keyed to the drive shaft and carrying an intermediate gear 22 adapted to be thrown into mesh with the several sections of a stepped or cone gear 23 fixed to the intermediate or driven shaft 24. This latter shaft may be provided with a fixed pinion 25 for driving a third shaft, not shown. It is evident that the shaft 12 may be driven through any suitable mechanism at any desired speed or speeds. The handle 50 of the rocker, as usual, extends through an opening in the front wall of the housing, and this handle may be provided with a plunger 36 for locking the rocker in its several positions.

When the transmission mechanism is in operation, the drive shaft 12 tends to flex or spring in a direction away from the cone gear 23 owing to the fact that the shaft is supported only at its ends so as to permit the shifting of the rocker. In accordance with the present invention, I provide for the purpose of preventing such springing of the drive shaft a fixed support or brace 50 having a surface in parallelism with the drive shaft, and on which surface the rocker 20, when it is shifted from one position to another, is adapted to slide. In the present illustrative disclosure of the invention, this brace is preferably shown as having a parti- or semicylindrical surface, the axis of which is coincident with the axis of the drive shaft 12; and the edge 51 of the rocker which slides on the surface of the brace is similarly curved so as to permit of angular adjustment of the rocker. The brace 50 is shown as having its ends apertured to receive the drive shaft.

I claim as my invention:—

1. In a transmission mechanism, a shaft, a slidable gear thereon, a rocker for shifting said gear and on said shaft, and a supporting member on which said rocker slides.

2. In a transmission mechanism, a shaft, a slidable gear thereon, a rocker journalled on said shaft for shifting said gear and having a surface concentric to said shaft, and a member having a similarly curved surface, supporting said rocker.

3. In a transmission mechanism, a shaft, a slidable gear thereon, a rocker journalled on said shaft for shifting said gear, an intermediate gear carried by said rocker, and a supporting member upon which said rocker slides and located to that side of said shaft opposite said intermediate gear.

BENGT M. W. HANSON.